United States Patent [19]

Pfeiffer et al.

[11] Patent Number: 4,959,190

[45] Date of Patent: Sep. 25, 1990

[54] PROCESS FOR MAKING A PLASTIC CONTAINER BY BLOW MOLDING

[75] Inventors: Pierre Pfeiffer, Drulingen; Benoit Cheval, Saverne; Paul Sigwalt, Drulingen, all of France

[73] Assignee: Sotralentz S.A., Drulingen, France

[21] Appl. No.: 285,901

[22] Filed: Dec. 16, 1988

[30] Foreign Application Priority Data

Dec. 18, 1987 [DE] Fed. Rep. of Germany ....... 3742993

[51] Int. Cl.$^5$ .................... B29C 49/04; B29C 49/20
[52] U.S. Cl. .................... 264/516; 264/235; 264/265; 264/346; 264/515; 425/503; 425/508
[58] Field of Search ............. 264/515, 516, 512, 346, 264/235, 265; 425/503, 525, 508

[56] References Cited

U.S. PATENT DOCUMENTS

| | | | |
|---|---|---|---|
| 3,886,253 | 5/1975 | Friendship | 264/346 |
| 4,093,683 | 6/1978 | Harley | 264/322 |
| 4,426,349 | 1/1984 | Kirschner | 264/346 |
| 4,719,072 | 1/1988 | Kojima et al. | 425/503 |
| 4,830,807 | 5/1989 | Warren et al. | 264/250 |

FOREIGN PATENT DOCUMENTS 1119855 7/1968 United Kingdom ................ 264/515
1339335 12/1973 United Kingdom ................ 425/525

Primary Examiner—Jan H. Silbaugh
Assistant Examiner—Catherine Timm
Attorney, Agent, or Firm—Herbert Dubno

[57] ABSTRACT

The process for making a plastic container by blow molding of a tubular parison made of a thermoplastic material, includes guiding a tube into a divided open blow mold, closing the blow mold and feeding pressurized air in the tubular parison squeezed off in the blow mold. However in the open blow mold which has a suitable receptacle at least one single-piece hoop ring made of thermoplastic material which could be made with usable tolerances by injection molding is mounted on the section and bonded with the tubular parison. An unsorted container ring which has an outer collar is used in the process and is fed to a preheat station in which the container ring is made stress-free and simultaneously is oriented in a plane. The stress-free and oriented container ring is gripped on the collar with a manipulator whose gripper is oriented in a plane corresponding the plane of the container ring and the manipulator is guided in the open blow mold and delivered to a moveable holding means in the blow mold which engages on the container ring itself or the collar.

4 Claims, 2 Drawing Sheets

PROCESS FOR MAKING A PLASTIC CONTAINER BY BLOW MOLDING

FIELD OF THE INVENTION

Our invention relates to a process and apparatus for making a plastic container by blow molding of a tubular parison made of thermoplastic material.

BACKGROUND OF THE INVENTION

The process for making a plastic container by blow molding a tubular parison preferably of extruded thermoplastic material comprises guiding a tube into a divided open blow mold, closing the blow mold and feeding pressurized air into the tubular parison squeezed off in the blow mold.

Further in the open blow mold which has a suitable receptacle, at least one single-piece hoop ring made of thermoplastic material with appropriate tolerances by injection molding is mounted on the tube and bonded with the tubular parison in the blow molding.

There is a problem with the known steps of the known process over which our invention is an improvement.

A container ring which is bonded with the container outer surface of the finished container has tolerances in the plane of the ring which are distributed statistically and are characterized as use tolerances and can amount to a few millimeters. This is troublesome and can lead to rejection and waste inasmuch as the container ring simultaneously is part of a sealing closure device which comprises an opposing ring on an associated container cover and a clamping ring or the like.

Because of the described use tolerances the closure device may not be able to satisfactorily seal.

To eliminate this disadvantage, container rings made by injection molding but sorted carefully to be sufficiently planar and thus free of use tolerances are usually used in the manufacturing process for the plastic container. That is expensive.

In addition, disturbing variations occur even when the container rings are carefully selected in this described way. The container ring can also have deviations from a truly circular shape and those that do must also be sorted out if this method is used.

OBJECTS OF THE INVENTION

It is an object of our invention to provide an improved process for making a plastic container so that the container rings bonded with the container outer surface of the finished container no longer have troublesome variations.

It is another object of our invention to provide an improved apparatus for carrying out this process which is especially suitable.

SUMMARY OF THE INVENTION

These objects and others, which will become more readily apparent hereinafter, are attained in accordance with our invention in a process for making a plastic container, e.g. a drum or barrel, by blow molding a tubular parison made of a thermoplastic material comprising guiding a tube into a divided open blow mold, closing the blow mold and feeding pressurized air into the tubular parison squeezed off in the blow mold.

According to our invention in our process unsorted container rings which have an outer collar are fed to a preheat station in which the container rings are made stress-free and simultaneously each is oriented in a plane. This stress-free and oriented container ring is gripped on the collar with a manipulator whose gripper engages in a plane corresponding to the plane of the container ring and the manipulator is guided in the open blow mold and delivered to a moveable holding means in the blow mold which engages on the container ring itself or the collar.

The proper alignment can be attained in an easy way when, for example, the oriented container ring is placed on a horizontal planar base member in the preheat station and is made stress-free on this base member and also is oriented by this planar base member in a plane. The influence of gravity can be used to advantage. The container ring can also be pressed on the planar base member. The base member can be constructed as a closed surface or as a ring-shaped base member.

We have found that with the currently known features or process steps disturbing dimensional variations or tolerances occur in the container rings of the finished container. This occurs even with careful sorting out of planar container rings because these container rings may possess an internal stress when made by injection molding which is released during preheating and acts to deform the container ring (even when a flat one has been selected).

According to our invention the container rings are made stress-free. According to the properties of the plastic material from which the container rings are made process temperatures and times are required which differ from mere preheating as is appropriate for making the bond in blow molding.

The required process temperatures and the required process times can, depending on the plastic be determined simply by experiment.

Our invention is further based on the knowledge that the mere temperature treatment is not enough. An alignment of the container ring in a plane must also be performed. Along with that then a pure heating step may be used since one performs the heat treatment sufficiently long at a sufficient temperature and simultaneously the force of gravity may act.

A mechanical support is provided on which the container ring can be pressed on a planar base member in a preheat station. Surprisingly in the process according to our invention testing of the circularity of the container ring made by injection molding and correction of the deviations from circularity is not required. These corrections automatically are effected in the process of our invention by themselves and of course in the blow molding. The container ring must reach a sufficiently high temperature in the blow molding.

Another aspect of the invention is an apparatus for making a plastic container from unsorted container rings and tubular parisons. This apparatus includes a preheating oven which has a circulating chain conveyor with a plurality of planar holders for the container rings to be preheated. The holders can be conveyed on a loading and unloading device. The key feature of the apparatus is a manipulator which makes the container ring stress-free and grips the oriented container ring on its collar and feeds it into the open blow mold.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
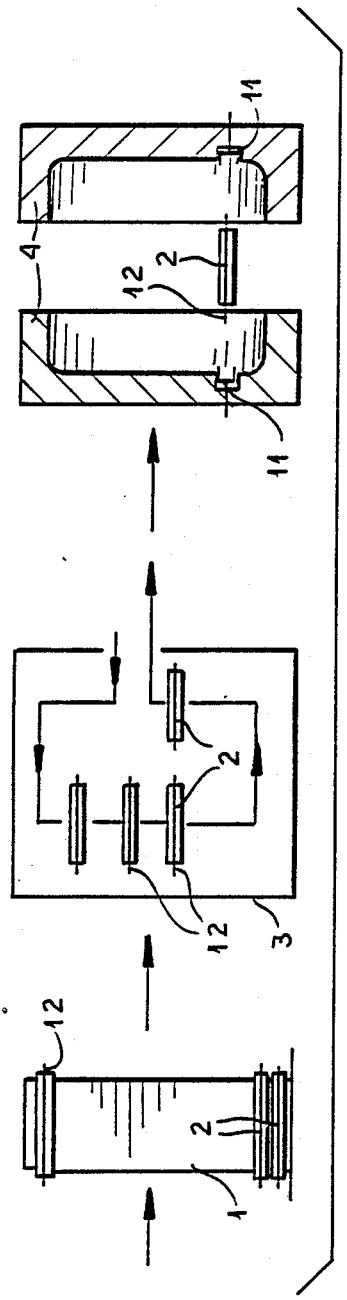
FIG. 1 is a diagrammatic flow chart showing a first portion of a process for blow molding a plastic container up to the step in which container rings are brought to the open blow mold.

From left to right from FIG. 1 a cylindrical stacking device 1 holds a plurality of unsorted container rings 2, to be fed to a preheating station 3 and a blow mold 4 which is constructed as a two-part blow mold. The individual container rings 2 are unsorted. They are taken from the stacking device 1, fed to the preheating station 3 and are put in the open blow mold 4 in a planar state.

FIG. 2 shows again from left to right the open blow mold 4 with a container ring 2 held on a holding means 11 and being inserted in a receptacle 4' of the blow mold 4 and the plastic tube 5 which is fed in the open blow mold 4 and is guided through and inserted in the container ring 2.

Figure 2:
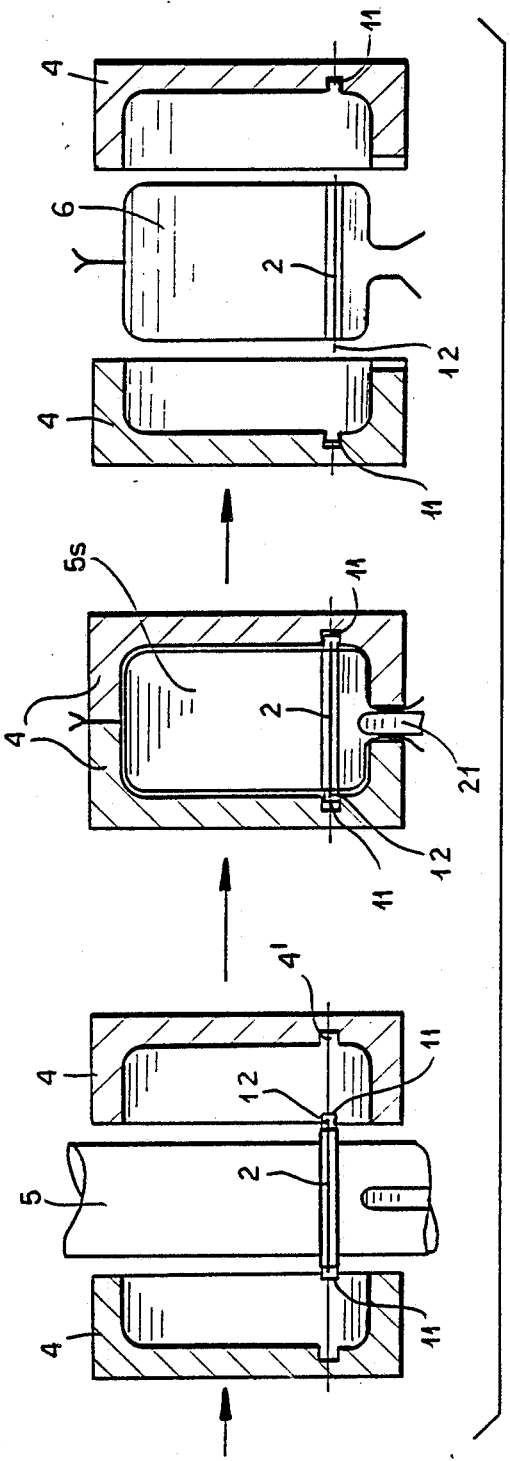
FIG. 2 is a diagrammatic flow chart showing the steps in the manufacture of the plastic container subsequent to those shown in FIG. 1 up to the removal of the plastic container from the blow mold.
Figure 3A:
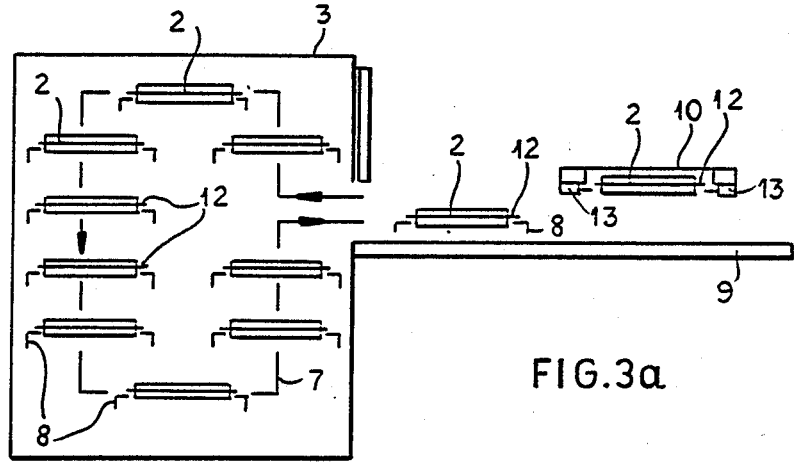
FIGS. 3a to 3d are diagrams illustrating successive process steps in operation of the apparatus.
Figure 3B:
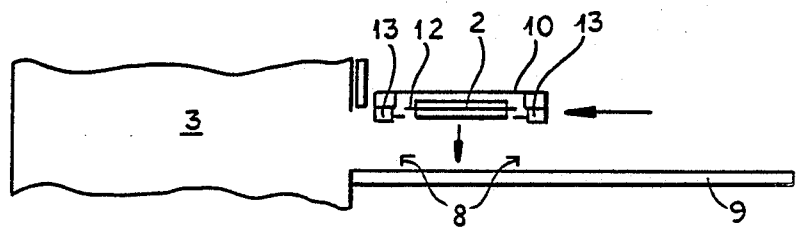
Figure 3C:
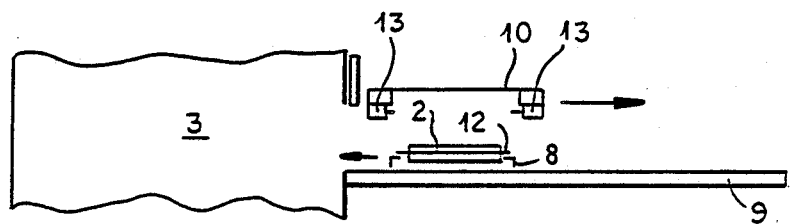
Figure 3D:
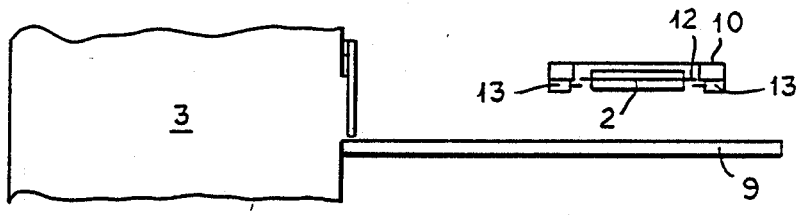

The next step to the right in FIG. 2 shows the closed blow mold and of course the blow molding process. In the blow mold 4 a sufficient cooling occurs so that, as the next figure to the right indicates, on again opening the blow mold 4 the finished plastic container 6 with the container ring 2 can be take out.

FIGS. 3a–3d show various structural components of the preheating station 3, namely a preheat oven, which has a circulating chain conveyor 7 with a plurality of planar holders 8 for the preheated container ring 2 and a loading and emptying device 9. The holders 8 are operable by a manipulator 10 which also feeds and also guides the individual container rings 2 into the blow mold 4.

From the drawing, it will be apparent that the process according to our invention which makes a plastic container 6 by blow molding a parison 5s of a tube of a thermoplastic material comprises first guiding a tube 5 of the thermoplastic material into a divided open blow mold 4, closing the blow mold 4 and feeding pressurized air into the tubular parison 5s squeezed off in the blow mold 4 by a means for feeding pressurized air 21.

In this process at least one container ring 2 made of thermoplastic material is conveyed in the open blow mold 4 having a suitable holding means 11 before start of the process. This container ring 2 can be made by injection molding. This container ring 2 is bonded with the section 5s in the blow molding of the container 6 after fitting them together.

According to our invention one uses unsorted container rings 2 which have an outer collar 12. Before blow molding these container rings 2 are fed into a preheat station 3 and made stress-free in it and simultaneously oriented in a predetermined plane. The stress-free and planar oriented container rings 2 are gripped on their outer collar 12 by a manipulator 10 whose gripper 13 is oriented in a plane corresponding that of the ring (FIGS. 3a–3d). The manipulator 10 feeds the container ring 2 into the open blow mold 4. It transfers the container ring 2 to the holding means 11 which engages on the container ring 2 itself or on its outer collar 12 moveable into the blow mold 4. From FIGS. 3a–3d, it will be apparent that the container ring 2 in the preheat station 3 rests on a planar holder 8, is mounted without stress on it and is pointed or oriented by it in its ring plane. A pressure can be exerted on the container ring 2 in the preheat station 3 to make it planar.

By "unsorted container rings" in the following we mean rings which have not been checked and subject to a quality control process in regard to ring planarity or deviations of other dimensions of the ring from certain set tolerances.

We claim:

1. A process for blow molding a container, comprising:
    (a) storing a multiplicity of unsorted injection molded one-piece hoop rings of thermoplastic material having outwardly projecting annular collars and which can deviate from a planar shape;
    (b) successively transferring the unsorted injection molded one-piece hoop rings of thermoplastic material having outwardly projecting annular collars stored in step (a) to a preheating station and heating each of said hoop rings at said station to a temperature sufficient to relieve stress in each hoop ring, to make the respective hoop ring planar and to enable subsequent blow molding to impart to each hoop ring a circularity correction;
    (c) engaging the collar of the respective hoop ring, preheated in step (b) to said temperature, with a manipulator and transferring the hoop ring engaged by the manipulator into an open blow mold having holding means for retaining the preheated ring in said open blow mold;
    (d) feeding a tube of thermoplastic material into said open blow mold and through said preheated ring retained in the open blow mold;
    (e) closing said blow mold to squeeze off a section of said tube in said blow mold;
    (f) blow-molding said section of said tube in said blow mold by inflating said section with pressurized air to form said container, to correct circularity of the ring in said blow mold, and to secure said ring to said container; and
    (g) removing the container formed in step (f) from the blow mold.

2. The process defined in claim 1 wherein said rings are made planar in step (b) by holding the ring in said preheating station in a respective plane.

3. The process defined in claim 1 wherein the respective rings are made planar by forcing them to be planar.

4. The process defined in claim 1 wherein a plurality of said rings are simultaneously heated in said preheating station and said rings are individually fed to and removed from said preheating station.

* * * * *